(12) United States Patent
Mochizuki

(10) Patent No.: US 6,792,417 B1
(45) Date of Patent: Sep. 14, 2004

(54) INFORMATION PROCESSING APPARATUS AND METHOD FOR STORING AND MANAGING OBJECTS TOGETHER WITH ADDITIONAL INFORMATION

(75) Inventor: Takatoshi Mochizuki, Amagasaki (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/401,834

(22) Filed: Sep. 22, 1999

(30) Foreign Application Priority Data

Sep. 22, 1998 (JP) .......................................... 10-267987

(51) Int. Cl.[7] .............................................. G06F 17/30
(52) U.S. Cl. ................................................ 707/3; 707/4
(58) Field of Search ........................... 707/1–10, 104.1; 345/203, 143, 127, 348

(56) References Cited

U.S. PATENT DOCUMENTS 5,278,946 A * 1/1994 Shimada et al. ......... 707/104.1
5,945,982 A * 8/1999 Higashio et al. ............... 707/3
6,016,487 A * 1/2000 Rioux et al. .................... 707/3
6,070,161 A    5/2000 Higashio

* cited by examiner

Primary Examiner—Jean M. Corrielus
Assistant Examiner—Anh Ly
(74) Attorney, Agent, or Firm—McDermott Will & Emery LLP

(57) ABSTRACT

The invention provides an information processing apparatus and method for storing and managing objects such as images, audio data and documents with additional information that is used for retrieving objects. A target object to which additional information is going to be added, and additional information objects accompanied with additional information are positioned on a map. In the process of adding additional information to the target object, the apparatus calculates distances between the target object and the additional information objects, and selects additional information from additional information belonging to additional information objects positioned within a predetermined distance from the target object to add the selected additional information to the object.

20 Claims, 19 Drawing Sheets

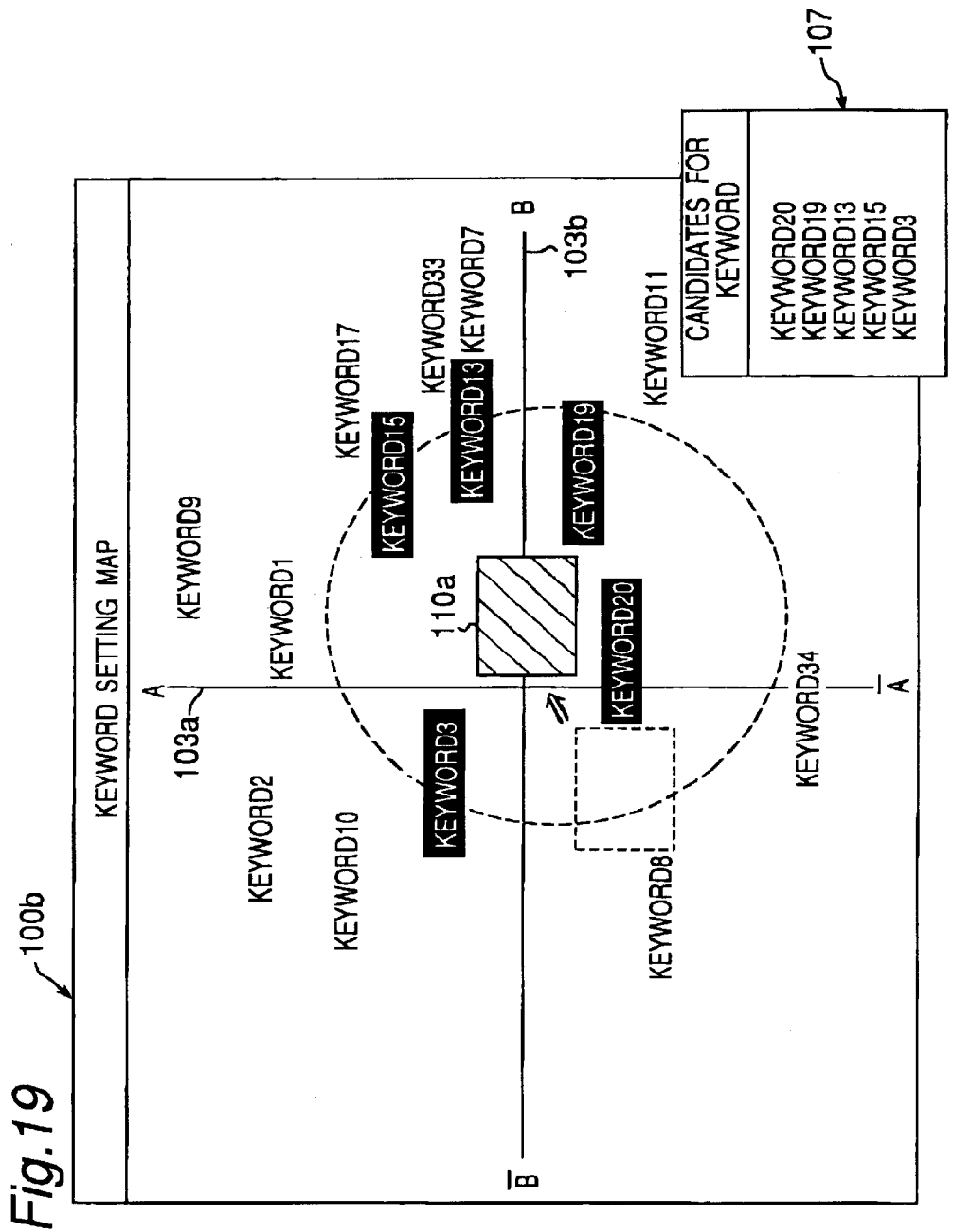

INFORMATION PROCESSING APPARATUS AND METHOD FOR STORING AND MANAGING OBJECTS TOGETHER WITH ADDITIONAL INFORMATION

This application is based on application No. H10-267987 filed in Japan, the contents of which is hereby incorporated by reference.

BACKGROUND OF THE INVENTION

1. Field of the Invention

The present invention relates to information processing apparatus and method for storing and managing objects such as image data, where the objects are stored and managed in association with additional information serving for retrieval of the objects.

2. Related Art

With recent years' remarkable development in the field of information processing, there has been a rapid improvement particularly in the performance of personal computers and the like. As a result, not only in particular applications such as the business field but also in general users, there have been increasingly wide-spreading information processing apparatuses such as image databases or electronic filing systems for capturing images by an input device, storing, managing and, as required, retrieving the images, and further printing by a printing device.

As one example of such information processing apparatuses, there has been an image retrieval apparatus for managing images and retrieving a desired image based on specified conditions from the managed image data. In the image retrieval apparatus, additional information is registered to image database in association with the image data. The additional information is used to retrieve image data from the database. The additional information to be associated with image data as a retrieval information includes, for example, attribute information such as file name, file creation date and file format, or other information such as keyword, hue and configuration.

The additional information added to image data for retrieving the image data becomes increasingly capable of various retrievals and improves in retrieval efficiency as the number of the additional information increases. Therefore, the additional information added to image data is, preferably, provided in as many types as possible. However, the more the number of registered image data increases, the more the work involved in the setting of additional information by the user becomes enormous, increasing the user's burden.

For example, when the user adds additional information to image data so as to allow retrievals with various keywords to be done, the user finds a plurality of items of additional information linked with one item of additional information, and adds the plurality of items of additional information to the image data at the same time. That is, the user would make work to find a plurality of terms similar in meaning and contents to image data before adding keywords. Such work would be considerably troublesome for the user increasingly as the number of items of additional information increases.

SUMMARY OF THE INVENTION

The present invention is directed to solve these problems. An object of the invention is to provide an information processing apparatus for managing objects, the apparatus capable of reducing the user's burden of the work of adding, to the objects, additional information to be used for retrieval of the objects.

An information processing apparatus according to the present invention is an apparatus for storing and managing objects together with additional information in a database. The apparatus comprises a positioning unit for positioning a target object and at least one of additional Information objects having additional information onto an n-dimensional map, a distance calculating unit for calculating distances between the target object and the additional information objects on the n-dimensional map, a selection unit for selecting additional information to be added to the target object from the additional information added to the additional information objects, based on said calculated distances, and a registration unit for registering the selected additional information to the database by adding the additional information to the target object.

Another information processing apparatus according to the present invention comprises a positioning unit for positioning additional information and an object onto the n-dimensional map, a distance calculating unit for calculating a distance between the additional information and the object on the n-dimensional map, a selection unit for selecting additional information to be added to the object from the additional information positioned on the n-dimensional map based on the calculated distance and a registration unit for registering the selected additional information to the database by adding said additional information to the object.

An information processing method according to the present invention is a method for storing and managing objects together with additional information in a database. The method comprises the steps of positioning a target object and at least one of additional information objects having additional information onto an n-dimensional map, calculating distances between the target object and the additional information objects on the n-dimensional map, selecting additional information to be added to the target object from the additional information added to the additional information objects, based on the calculated distances and registering the selected additional information to the database by adding the additional information to the target object.

A data storage medium according to the present invention records a program for storing and managing objects together with additional information in a database. The program comprises the steps of positioning a target object and at least one of additional information objects having additional information onto an n-dimensional map, calculating distances between the target object and the additional information objects on the n-dimensional map, selecting additional information to be added to the target object from the additional information added to the additional information objects, based on the calculated distances and registering the selected additional information to the database by adding the additional information to the target object.

According to the present invention, the user can easily add a plurality of items of additional information to an object with simplicity, so that the burden in the additional information setting work can be reduced.

BRIEF DESCRIPTION OF THE DRAWINGS

FIG. 19 is a view showing a keyword window showing candidates of keyword and a keyword setting map.

DETAILED DESCRIPTION OF THE PREFERRED EMBODIMENTS

Hereinbelow, preferred embodiments of the information processing apparatus according to the present invention are described with reference to the accompanying drawings.

First Embodiment

The following information processing apparatus operates for storing and managing objects such as images, audio data and documents together with additional information in a database. The additional information may be used for retrieving objects from the database. In this apparatus, an object to which additional information is going to be added (referred to as "target object") and objects to which additional information has already been added (referred to as "additional information objects") are positioned onto a specified map. Then, additional information is selected to be added to the target object, based on distances between the target object and the additional information objects on the map.

Figure 1:
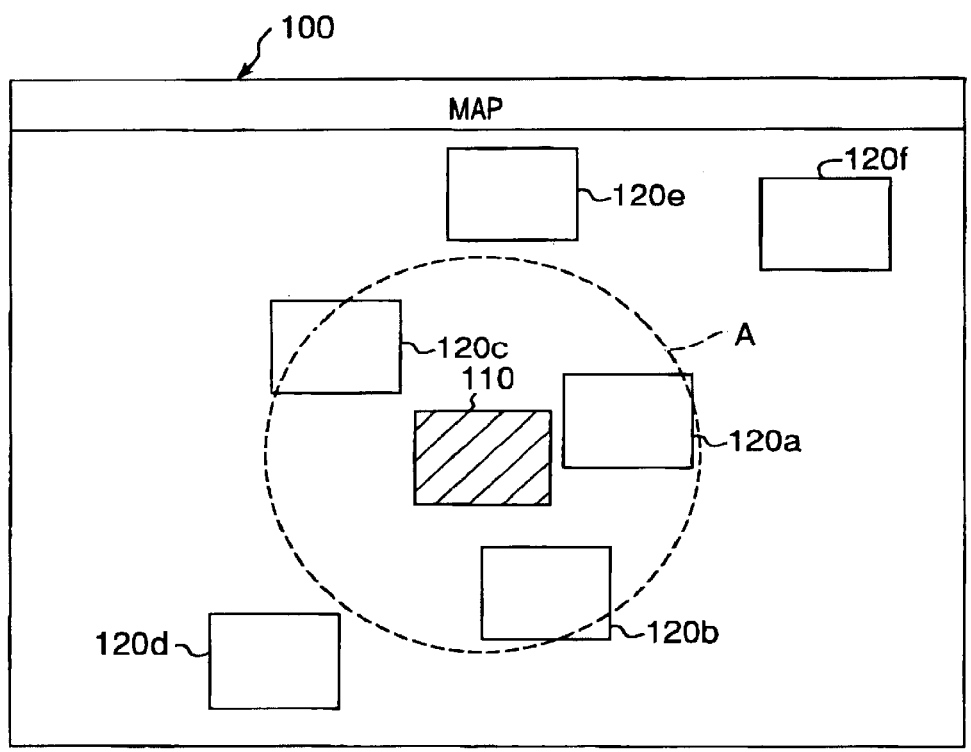
FIG. 1 is a view for explaining the concept of a keyword adding method of an information processing apparatus of first embodiment.

That is, as shown in FIG. 1, a target object 11 0 and additional information objects 120a, 120b, 120c, 120d, 120e and 120f which are accompanied by various types of additional information are positioned on a map 100 according to similarities among those objects. The information processing apparatus selects, as additional information to be added to the target object 110, additional information corresponding to the additional information objects 120a, 120b and 120c positioned within a predetermined distance from the target object 110 (within a broken line A in the figure) on this map 100, and then adds the selected additional information to the target object 110. This can reduce the burden of the user's work to add additional information to objects. Details of this process are explained below.

It is noted that the following description is given by using image data as objects as well as keywords as one example of additional information to be added to the objects. Therefore, the information processing apparatus of this embodiment stores and manages image data into an image database together with additional information used for retrieving the image data. In particular, based on a positional relation between image data to which keywords are going to be added (referred to as "target image") and image data to which keywords have already been added (referred to as "keyword images"), this information processing apparatus decides keywords to be added to the target image.

Figure 2:
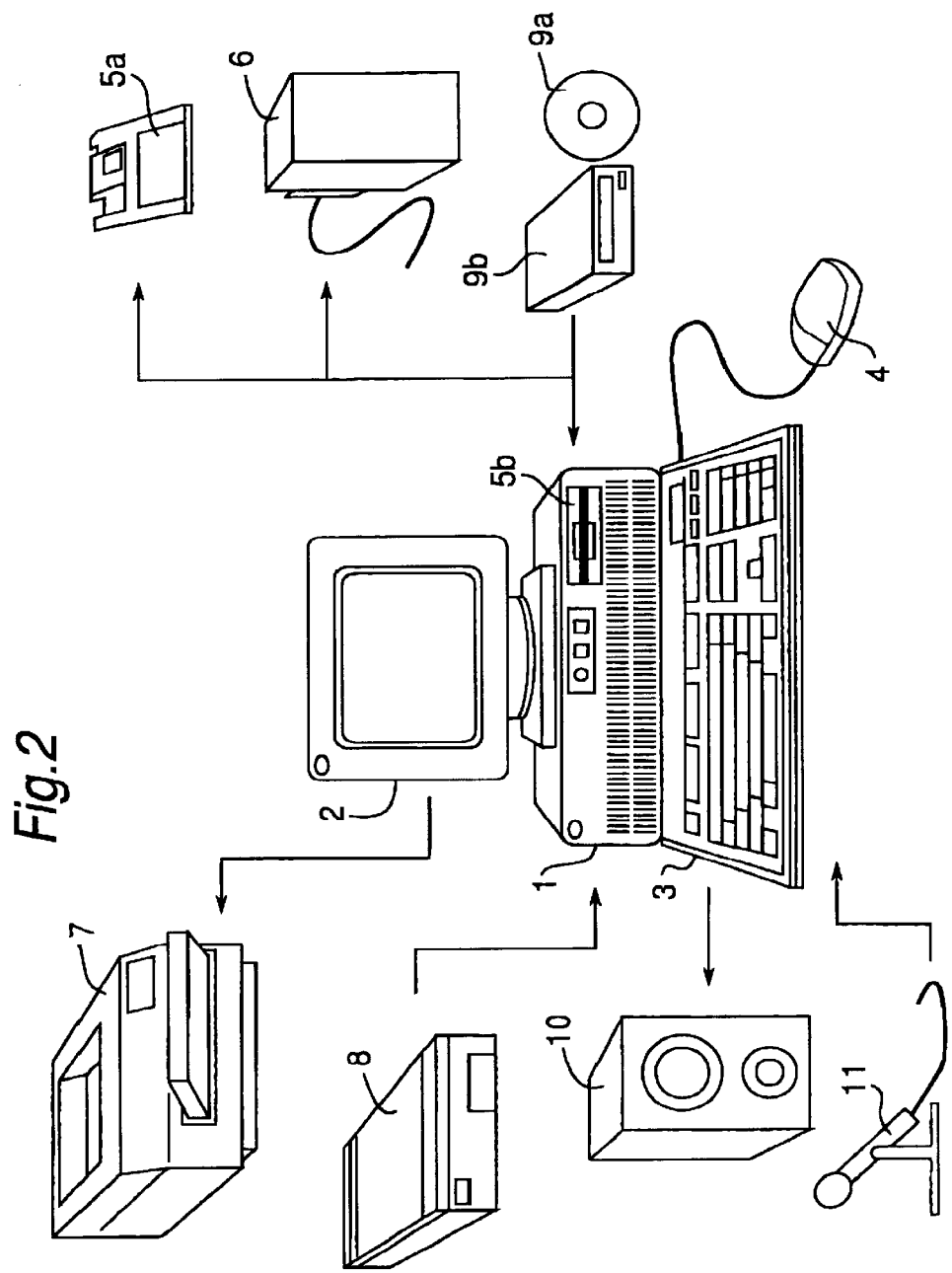
FIG. 2 is a view outlining the configuration of the information processing apparatus of first embodiment.

FIG. 2 shows a schematic view showing configuration of the information processing apparatus (referred to as "system") of this embodiment. As shown in FIG. 2, the system having a central processing unit (CPU) is made up around a control unit 1 that controls the whole system. The CPU is implemented by, for example, a Pentium of Intel Corporation. This control unit 1 connects a display 2 for displaying images, characters, indication for operation and the like, a keyboard 3 and a mouse 4 for inputting various types of setting and instructional operations and the like, a floppy disk 5a and a hard disk unit 6 which are data storage media, a printer 7 for printing characters, image data and the like, a scanner 8 for capturing image data, a CD-ROM unit 9b for reading out data stored in a CD-ROM 9a, a loudspeaker 10 for audio output, and a microphone 11 for audio input.

Figure 3:
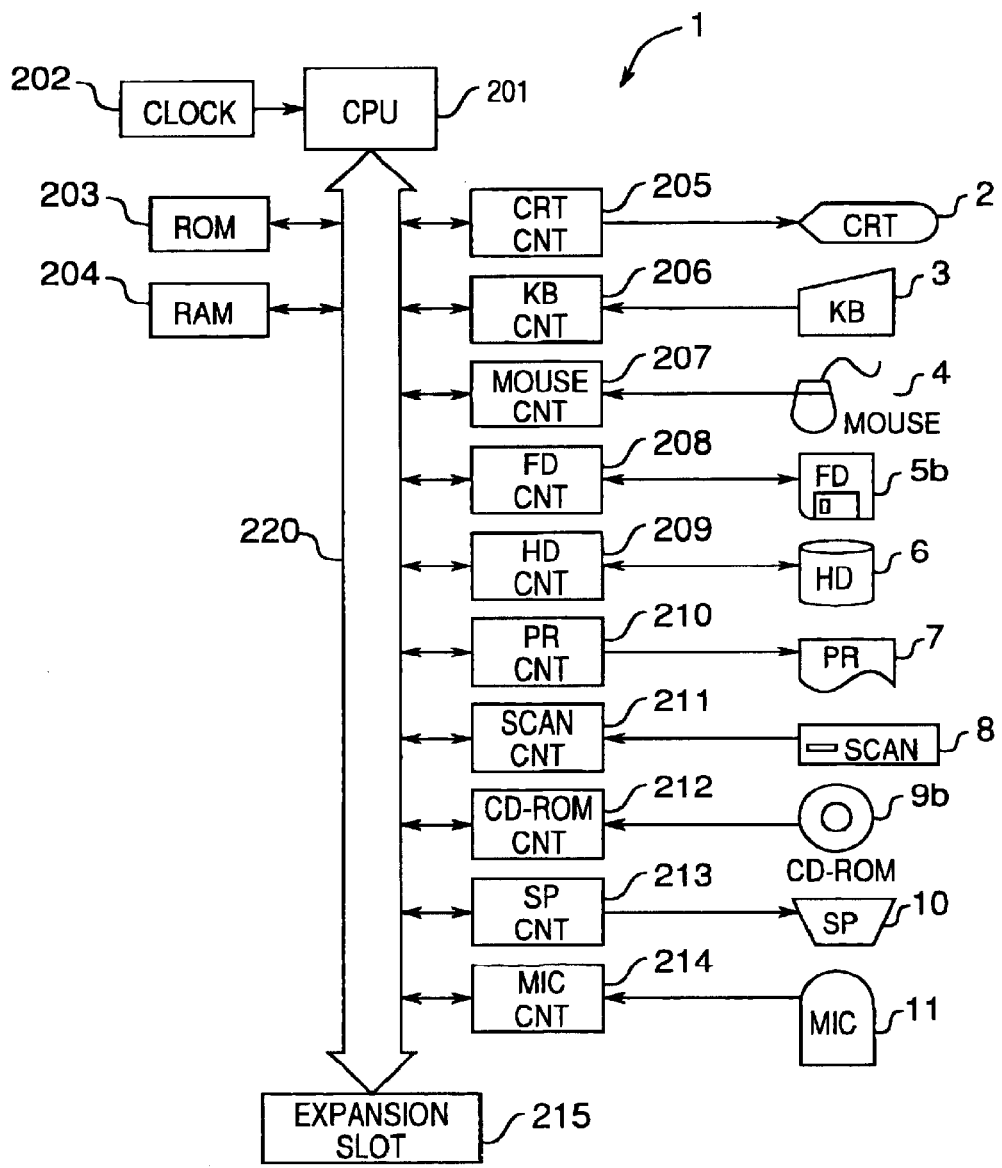
FIG. 3 is a block diagram about a control unit of the information processing apparatus of first embodiment.

FIG. 3 shows a block diagram of this system. A ROM 203 to store programs for controlling this system and a RAM 204 to store temporarily programs and data to be executed for control processes by the CPU 201 are connected to the CPU 201 via a data bus 220. Other circuits are also connected to the CPU 201 via the data bus 220, including a display control circuit 205 for controlling the display 2 for the display of images or characters or the like, a keyboard control circuit 206 for controlling the transfer of inputs from the keyboard 3, a mouse control circuit 207 for controlling the transfer of inputs from the mouse 4, a floppy disk drive control circuit 208 for controlling a floppy disk drive 5b, a hard disk drive control circuit 209 for controlling the hard disk drive 6, a printer control circuit 210 for controlling outputs to the printer 7, a scanner control circuit 211 for controlling the scanner 8, a CD-ROM drive control circuit 212 for controlling the CD-ROM drive 9b, a loudspeaker control circuit 213 for controlling the loudspeaker 10, and a microphone control circuit 214 for controlling the microphone 11. Further connected to the CPU 201 are a clock 202 for generating a reference clock needed to operate the system and, via the data bus 220, an expansion slot 215 for the connection of various expansion boards. In addition, with a SCSII board connected to the expansion slot 215, the floppy disk drive 5b, the hard disk drive 6, the scanner 8, the CD-ROM drive 9b or the like may be connected via the SCSII board.

Although the floppy disk 5a and the hard disk drive 6 are used as data storage media in this system, other information recording media such as a magneto-optical disk (MO) may be used. Also, even though the scanner 8 is used as an input device for image data, other data input devices such as a still video camera or a digital camera may be used. Further, although the printer 7 is used as an output device, other output devices such as a digital copier may be used. Also in this system, programs for implementing a data management system are stored in the ROM 203. However, when part or whole of the programs is stored in an information recording medium such as the floppy disk 5a, hard disk unit 6 or CD-ROM unit 9b, the programs may be read from the information recording medium as required and loaded into the RAM 204 to be executed.

Figure 4:
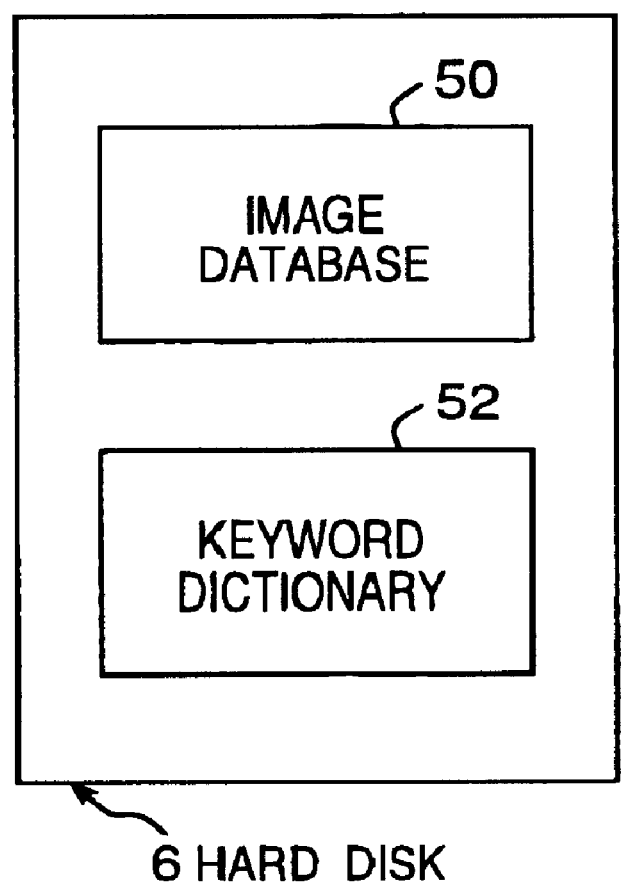
FIG. 4 is a view showing an image database and a keyword dictionary constituted on a hard disk drive.

In this system, as shown in FIG. 4, an image database 50 for storing therein image data and the like and a keyword dictionary 52 for registering therein keywords to be used are logically constituted on the hard disk drive 6.

The image database 50 stores image data and additional information used as retrieval information for the image data in association with each other. The additional information includes, for example, keywords, hue, icons and the like. Also, the additional information, when added to image data, is added together with a priority showing the degree of association between the image data and the additional information. The higher the value of the priority is, image data and keyword associates more strongly, that is, the higher the priority is, the higher the preference of the keyword to the image data is.

Figure 5:
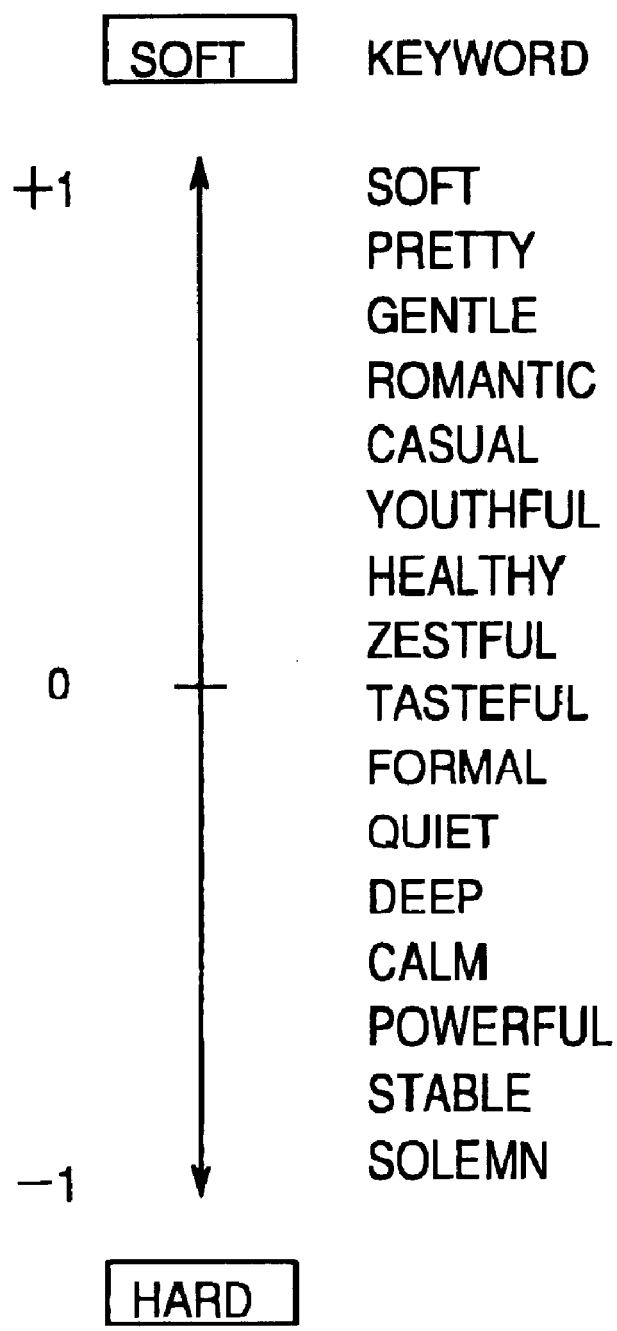
FIG. 5 is a view for explaining relation-items of keywords and association degrees therewith.

In the keyword dictionary 52, stored are keywords which are to be added to image data as additional information, and association degrees thereof. The association degree indicates how strongly the keyword relates to predetermined relation-items. For example, the relation-item is set to "bright←→dark" or "soft←→hard", and the association degree is set to have a value from −1 to +1. As shown in FIG. 5, when the item is "soft←→hard", it shows that the more the association degree to the item gets close to −1, the more the keyword is associated with "soft", while the more the association degree gets close to +1, the more the keyword is associated with "hard". Relation among the keywords can be defined via the relation-items and the association degrees, as shown in FIG. 5

Figure 6:
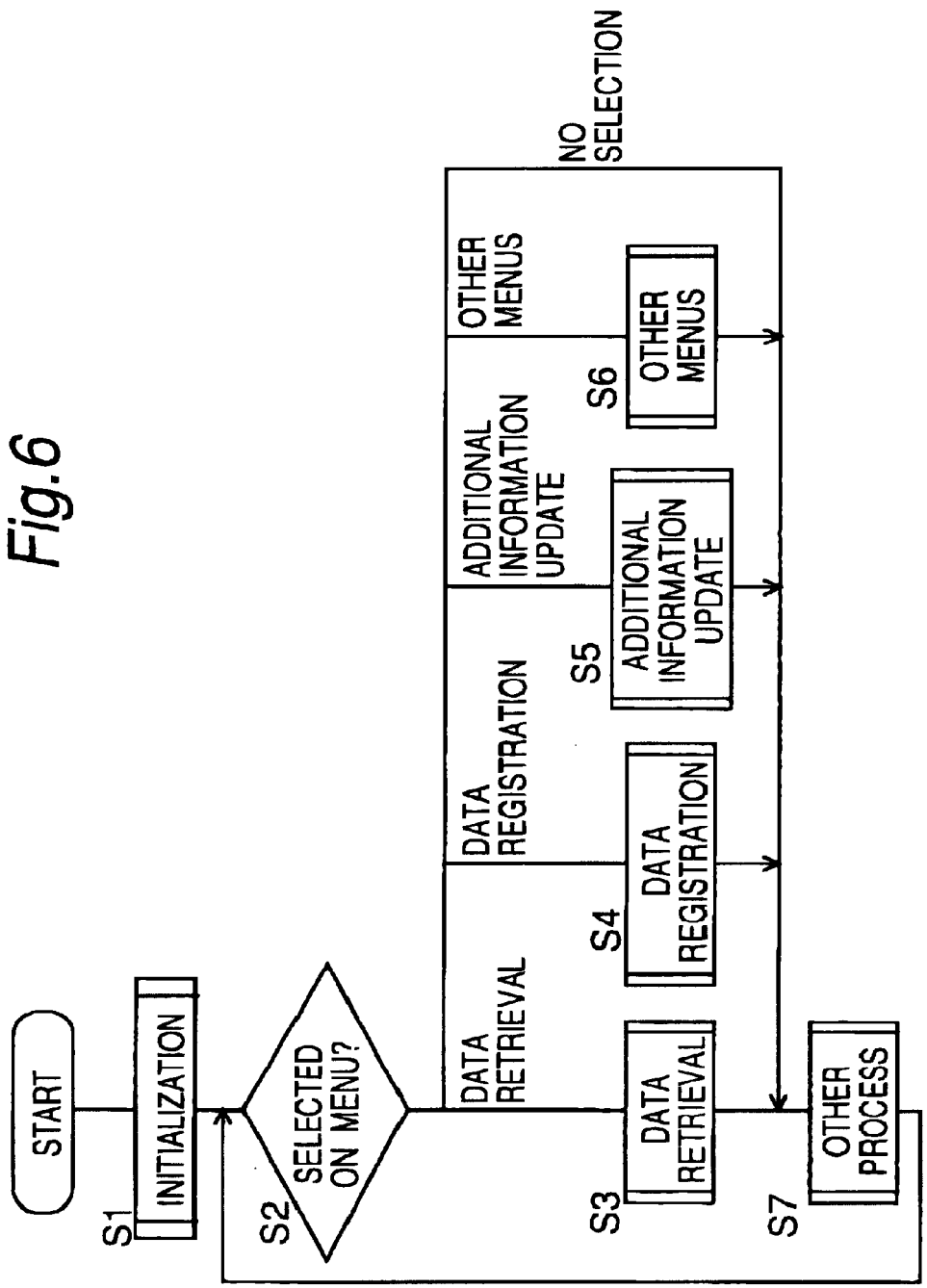
FIG. 6 is a flowchart of a main routine in the information processing apparatus.

FIG. 6 is a flowchart showing a main routine of a program to be executed by the CPU 201. This system (CPU 201) executes individual processes sequentially according to user's operations.

With the program started up, first, an initial process is performed (S1). The process performs the initialization of flags or other process necessary for subsequent processes, the display of an initial menu screen, and the like. On the initial menu screen, predefined icons for selecting "DATA RETRIEVAL", "DATA REGISTRATION", "OTHER PROCESS" and so on are displayed. Next, it is decided whether or not a specified process has been selected by the user on the initial menu screen (S2). When "DATA RETRIEVAL" is selected at step S2, the program goes to a data retrieval process (S3) for performing a process of retrieving desired document data from the database 50, and then goes to step S7. When "DATA REGISTRATION" is selected at step S2, the program goes to a data registration process (S4) for capturing a document from a document input device, adding retrieval information thereto and registering the data to the database 50. The program then goes to step S7. When "ADDITIONAL INFORMATION UPDATE" is selected at step S2, the program executes a process (S5) for registering keywords to be added to the document data together with degrees of association among the keywords or other process.

The program then goes to step S7. When "OTHER MENUS" is selected at step S2, the program executes other menu-selected processes (S6) and then goes to step S7. When none is selected at step S2, the program goes to step S7. The program executes other processes at step S7, and upon completion of all the processes, the program returns to step S2. After this on, the above processes are iterated.

The data retrieval process (S3), the other menu process (S6) and the other processes (S7) are not described in this specification since they are basically similar to those of well-known data retrieval systems. The data registration process (S4) and the additional information updating process (S5) according to this invention are described in detail below.

Figure 7:
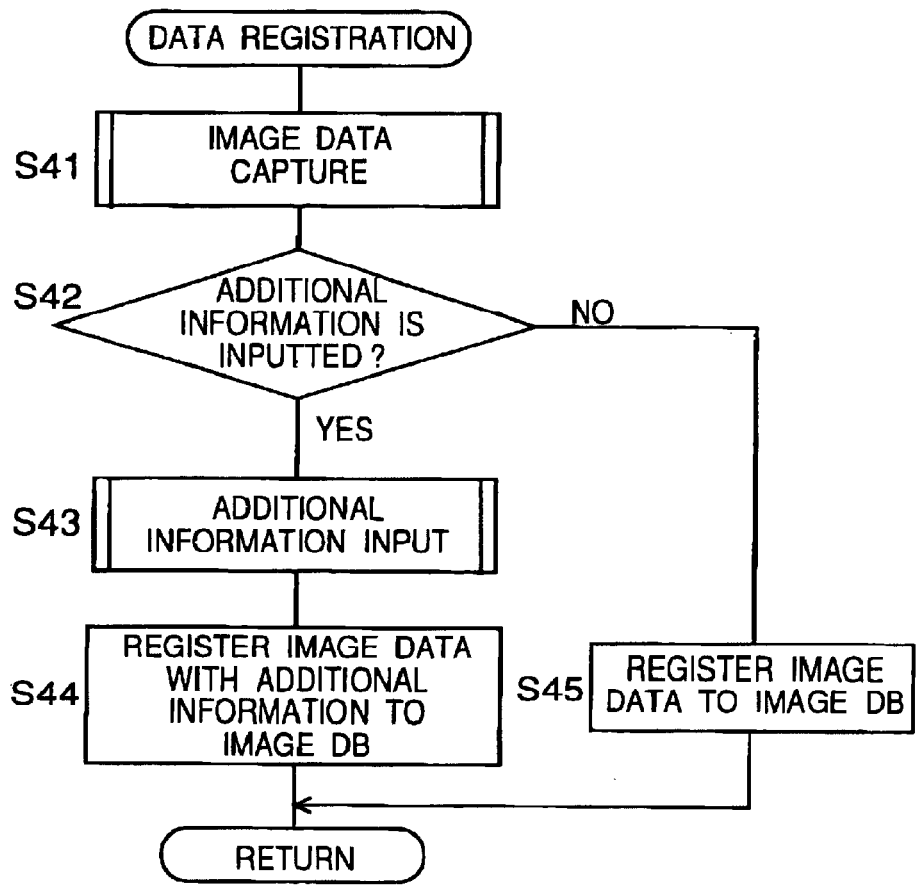
FIG. 7 is a flowchart of data registration process in the information processing apparatus.

With reference to the flowchart of FIG. 7, the data registration process (step S4) is described.

In this process, first, a process for capturing an image data to be registered in the image database 50 is performed (S41). Details of the image data capture process are described later. Next, it is decided whether or not additional information for the captured image is inputted (S42). This decision is made based on user's operation on the screen of the display. When additional information is inputted, a process for input of additional information is performed (S43). Details of this additional information input process are described later. After that, image data is registered in the image database 50 together with the additional information set by the additional information input process (S44). The program then returns. When additional information is not inputted at step S42, image data alone is registered in the image database 50 (S45). The program then returns.

Figure 8:
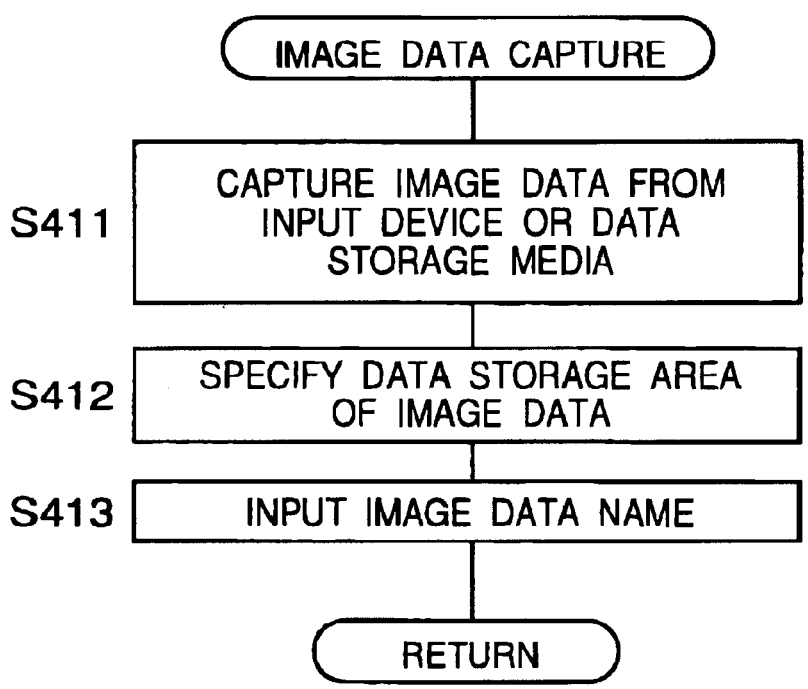
FIG. 8 is a flowchart of image data capture process in the information processing apparatus.

With reference to the flowchart of FIG. 8, the image data capture process (step S41) is described.

In this process, first, image data is captured from the scanner 8 or other image input device or from a recording medium such as the floppy disk 5a on which image data has been recorded (S411). Next, information as to the setting of storage destination of image data set on the screen by the user as well as data name of the image data are inputted (S412, S413). Then the program returns.

Figure 9:
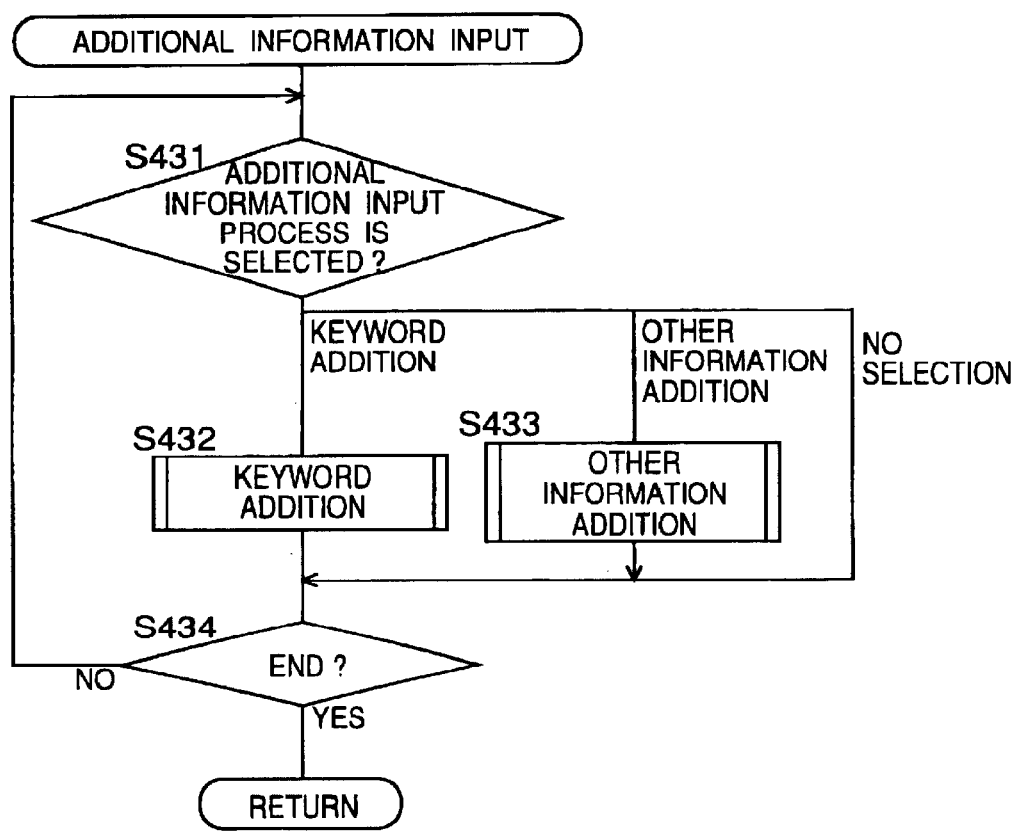
FIG. 9 is a flowchart of additional information input process in the information processing apparatus.

With reference to the flowchart of FIG. 9, the additional information input process (S43) is described. In this process, a screen for inputting additional information is displayed, and a process for selecting additional information to be added by the user is selected on the screen.

First, it is decided whether or not a specified process has been selected by the user on the additional information input screen (S431). When "KEYWORD ADDITION" is selected, a process for adding keywords as additional information is performed (S432). Then, the program goes to step S434. The keyword addition process is described later. When "OTHER INFORMATION ADDITION" is selected at step S431, a process for adding information other than keywords is performed (S433), and then the program goes to step S434. When none is selected on the additional information input screen, the program goes to step S434. At step S434, it is decided whether or not the additional information input process is still continued. The program returns to step S431 when it is continued, but the program exits when the process is ended.

Figure 10:
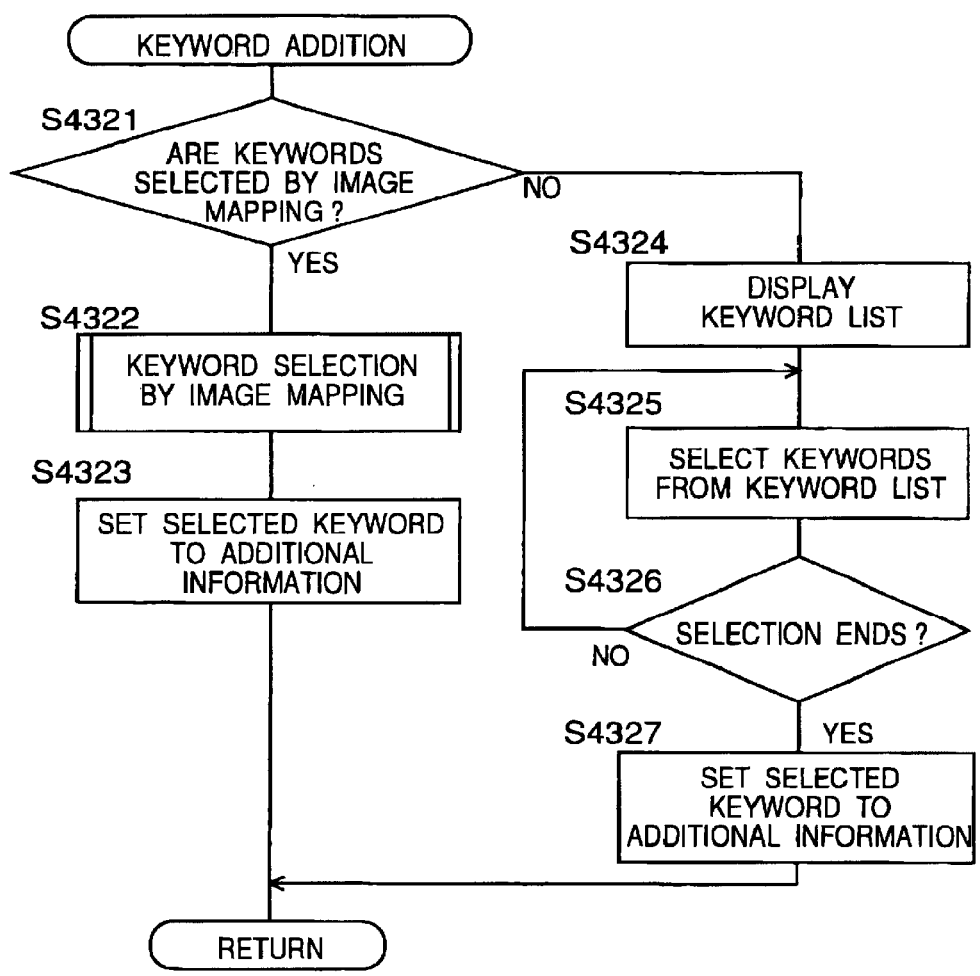
FIG. 10 is a flowchart of keyword addition process in the information processing apparatus.

With reference to the flowchart of FIG. 10, the keyword addition process (step S432) is described.

In this process, first, from judgment of a user's operation, it is decided whether or not keywords are selected by positioning images onto a map for setting keywords (S4321). When it is decided that the keyword selection is performed by positioning images onto the map, a process for selecting keyword by image mapping is performed (S4322). In this process, keywords to be added to the image are selected by image mapping, and details of this process are described later. After that, keywords selected in the keyword selection by image mapping are set to additional information (S4323). After that, the program returns.

Meanwhile, when the keyword selection by image mapping is not performed at step S4321, a list of registered keywords is displayed by looking up to the keyword dictionary 52 (S4324). Keywords designated by the user are selected from the displayed list of keywords (S4325). It is decided whether or not the user completes the selection from the list of keywords (S4326). When the selection is not been completed, the program returns to step S4325. When the selection is completed, the keywords selected by the user are set to additional information (S4327), the program then returning.

Figure 11:
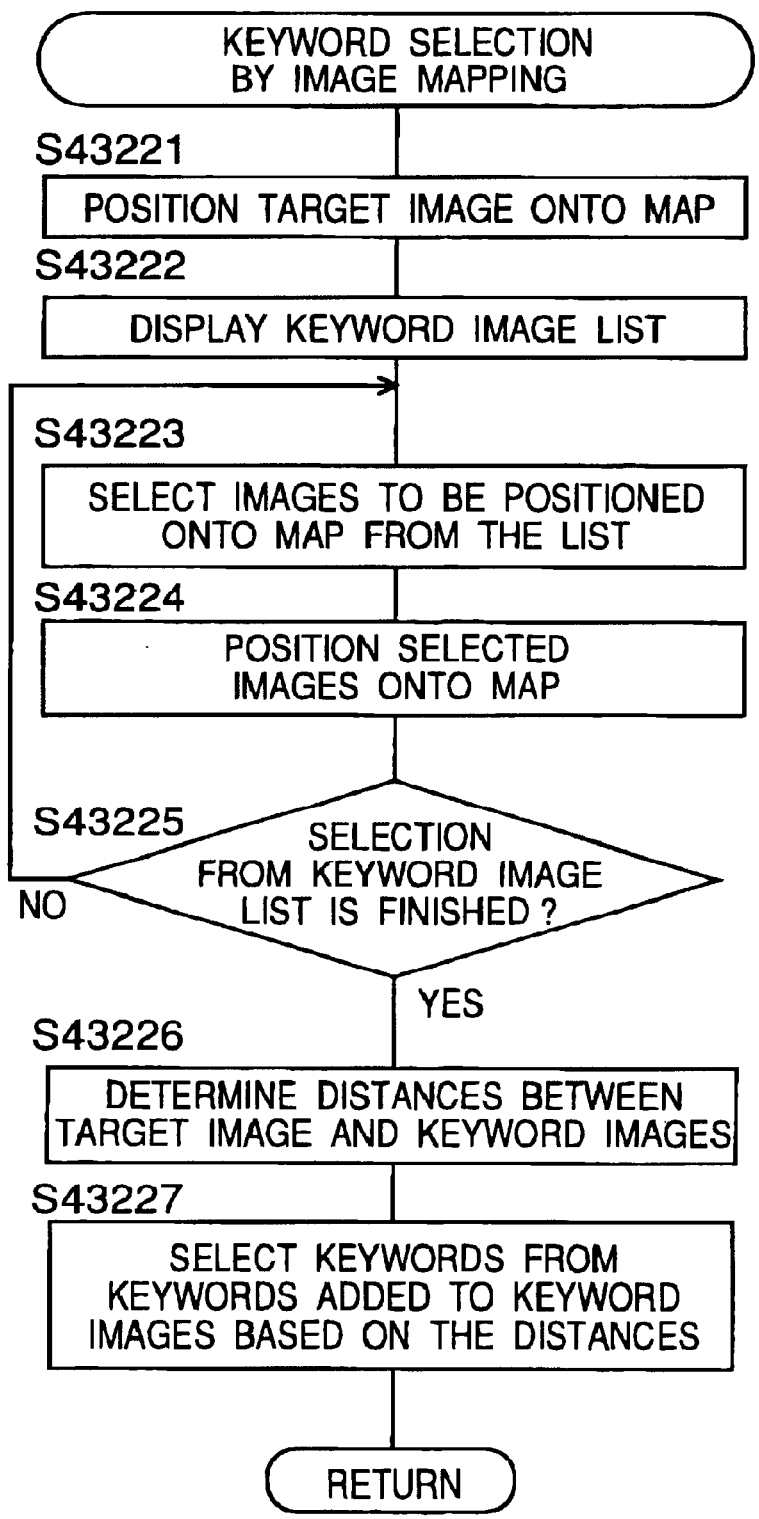
FIG. 11 is a flowchart of keyword selection process by image mapping in the information processing apparatus.
Figure 12:
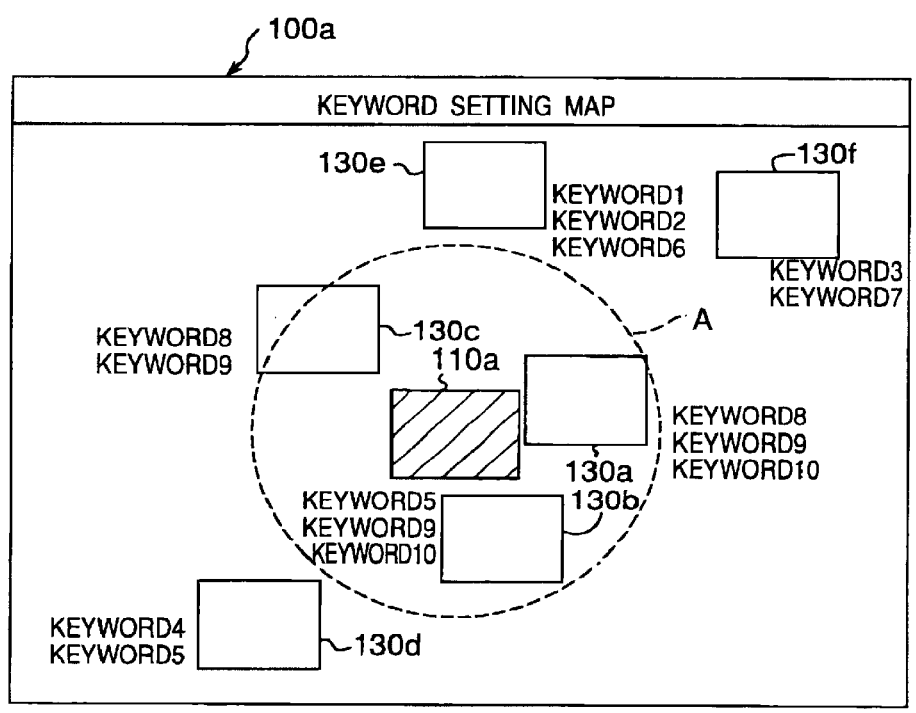
FIG. 12 is a view showing a keyword setting map in first embodiment.

With reference to the flowchart of FIG. 11, the keyword selection by image mapping process (step S4322) is described. In this process, a target image 110a and keyword images 130a, 130b, 130c, 130d, 130e and 130f are positioned onto the keyword setting map 100a by the user as shown in FIG. 12, and after that, keywords to be added to the target image 110a are selected based on their positional relation.

Figure 13:
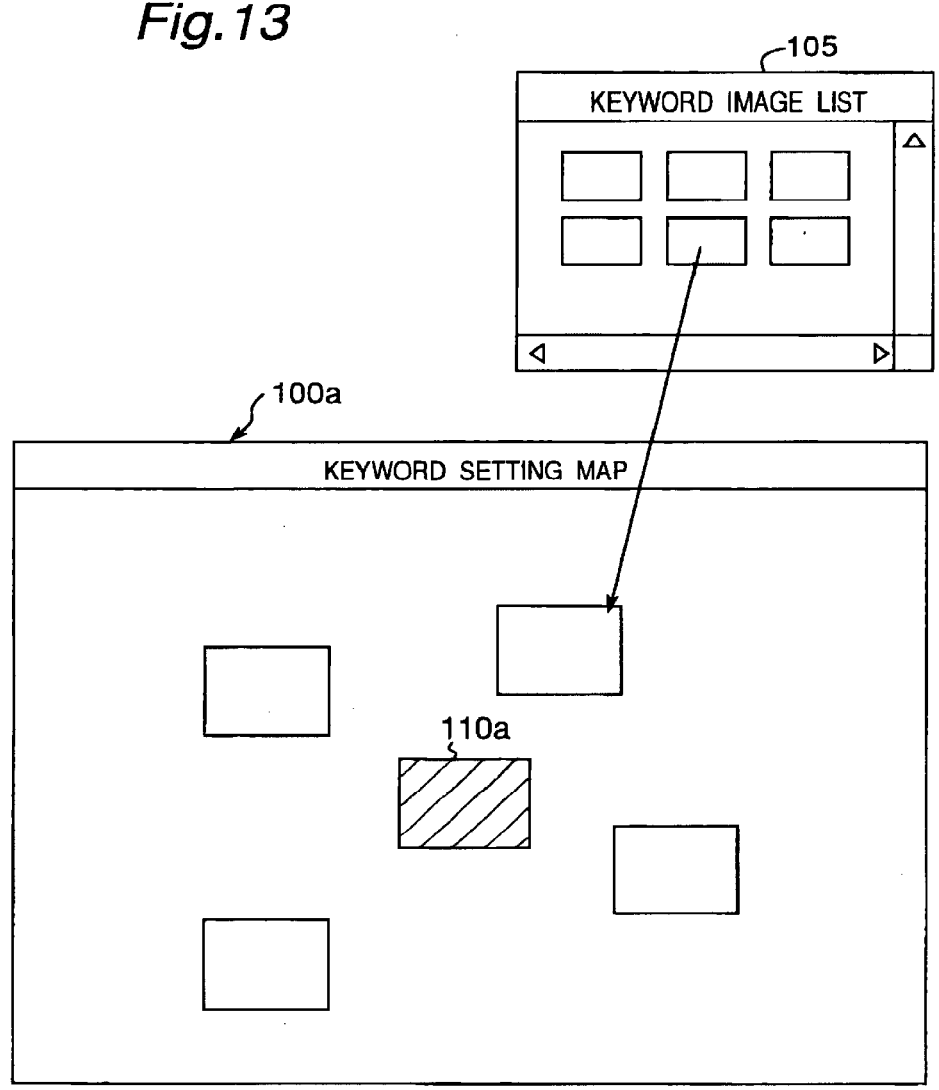
FIG. 13 is a view showing a keyword image list and a keyword setting map.

First, the CPU 201 positions the target image 110a, to which keywords are to be added, onto the keyword setting map 100a according to user's operation (S432221). Next, a keyword image list 105 in which images having keywords as additional information are listed is displayed (S43222) (see FIG. 13). After the display of the keyword image list 105, the user selects images similar to the target image 110a from the keyword image list 105, and positions the selected images around the target image 110a on the keyword setting map 100a by taking into consideration their degrees of similarity. In this process, the user positions the keyword images onto the keyword setting map 100a so that the higher the similarity between the target image 110a and a keyword image is, the shorter the distance between the two images becomes. According to such a user's operation, the CPU 201 selects images similar to the target image 110a from the keyword image list 105 (S43223), and positions the images around the target image 110a (S43224).

Next, it is decided whether or not the processes of image selection from the keyword image list 105 and image mapping by the user are completed (S43225). When they are completed, the program returns to step S43223. The above processes (steps S43223, S43224 and S43225) are iterated until an ending operation for the keyword image selection and positioning is given by the user. When the keyword image selection and positioning are completed, distances between the target image 110a and the keyword images on the keyword setting map 100a are determined as their positional relation (S43226). Based on the determined distances, keywords to be added to the target image 110a are selected (S43227). That is, with respect to the keyword images 130a, 130b and 130c positioned within a predetermined distance from the target image 110a, all the keywords that have been added to those keyword images 130a, 130b and 130c are selected as keywords to be added to the target image 110a (see FIG. 12). Like this, in this embodiment, keywords to be added to the target image 110a are determined based on distances between images positioned on the keyword setting map 100a.

In the keyword selection, instead of selecting all the keywords that have been added to the keyword images positioned within the predetermined distance from the target image 110a, keywords may alternatively be selected as follows:

(1) Only keywords that have been added in common to a plurality of keyword images positioned within a predetermined distance from the target image are selected. In FIG. 12, a KEYWORD9 is selected which belongs to the keyword images 130a, 130b and 130c within the predetermined distance from the target image;

(2) In the keyword images positioned within the predetermined distance from the target image, keywords are selected more preferentially from keywords belonging to the keyword images, as the distance between the target image 110a and keyword images on the map 100a becomes shorter. For example, the shorter the distance between the target image and a keyword image, the larger the number of keywords that are to be selected from keywords added to the keyword image. In FIG. 12, the distance of a keyword image from the target image 110a increases in an order of the image 130a, the image 130b and the image 130c, so that the number of keywords selected from the image 130a is set to 3, the number of keywords selected from the image 130b is set to 2 and the number of keywords selected from the image 130c is set to 1; or (3) Keywords that have been added to the keyword images positioned on the keyword setting map 100a are all selected. In FIG. 12, keywords that have been added to all the keyword images 130a, 130b, 130c, 130d, 130e and 130f on the map 100a, i.e, the KEYWORD1 to KEYWORD 10 are selected and added to the target image.

On the registration to the image database (in step S4323), the keyword may be added more preferentially as the distance between the target image to which the keyword belongs and keyword images on the map 100a is shorter. For example, the shorter the distance between the target image and the keyword image is, keyword of the image data may be added to the target image with the higher priority. The distance between the target image and the keyword image represents a similarity between these two images. Therefore selecting or adding keywords preferentially according to the shortness of the distance between the images as described above makes it possible to carry out more appropriate keyword addition in which the association degree between the keyword and the image data is taken into consideration. By using keywords added in this way, retrieval precision in the retrieval of image data is improved.

Figure 14:
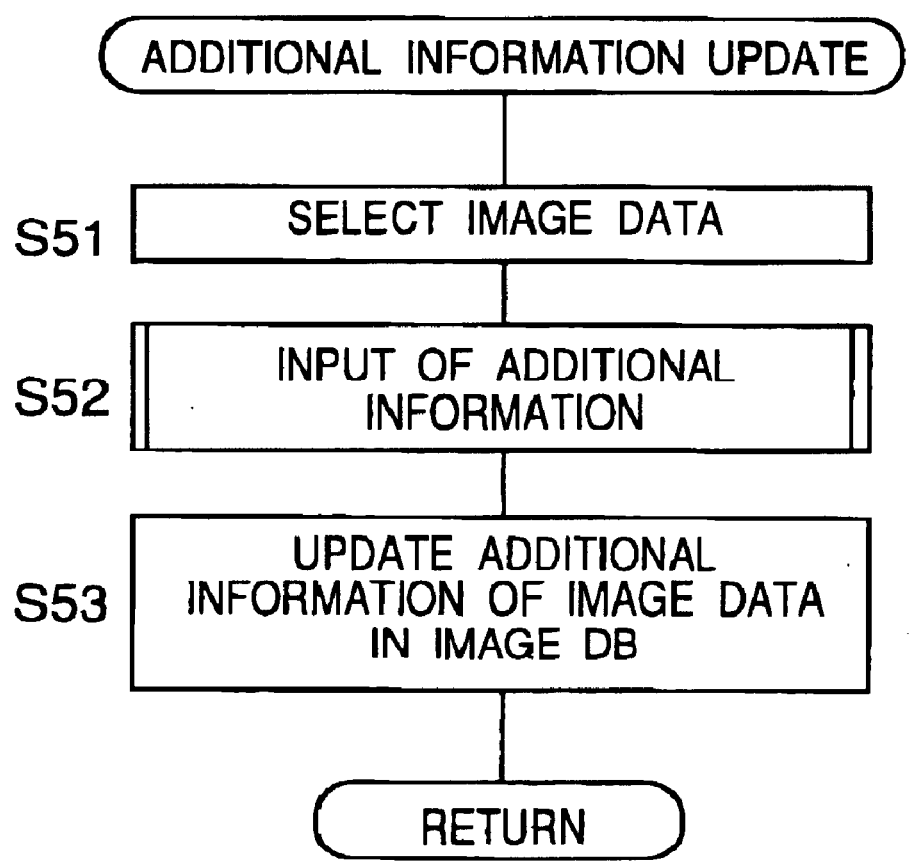
FIG. 14 is a flowchart of additional information update process in the information processing apparatus.

With reference to the flowchart of FIG. 14, the additional information update process (step S5) is described.

In the additional information update process, first, an image with additional information to be updated is selected according to the user's designation (S51). Next, a process is performed for inputting additional information in order to add new additional information to the selected image (S52). This additional information input process is similar in processing contents to the additional information input process (step S43) as described before. When new additional information is set at step S52, additional information for the selected image is updated by the new additional information in the image database 50 (S53). The program then returns.

As shown above, in the information processing apparatus of this embodiment, for the addition of keywords to an image, on a map on which images with keywords already added thereto have been positioned, the image to which keywords are to be added is positioned to around similar images. Only doing this process allows a plurality of related keywords to be simultaneously selected and added to the image, simply. Thus, the burden on the user in the keyword addition work is reduced.

In addition, images can also be positioned onto the map 100a in n dimensions by setting n feature axes showing specified features on the map 100a, and by positioning the images along the individual feature axes in a correspondence relation between features of the images and the features shown by the individual feature axes.

Second Embodiment

In this embodiment, another example of the keyword selecting process by image mapping is shown. This embodiment differs from the process (S4322) in the first embodiment in that a target image is positioned after keyword images are positioned on the keyword setting map.

With reference to the flowchart of FIG. 15, the keyword selecting process by image mapping in this embodiment is described below.

Figure 16:
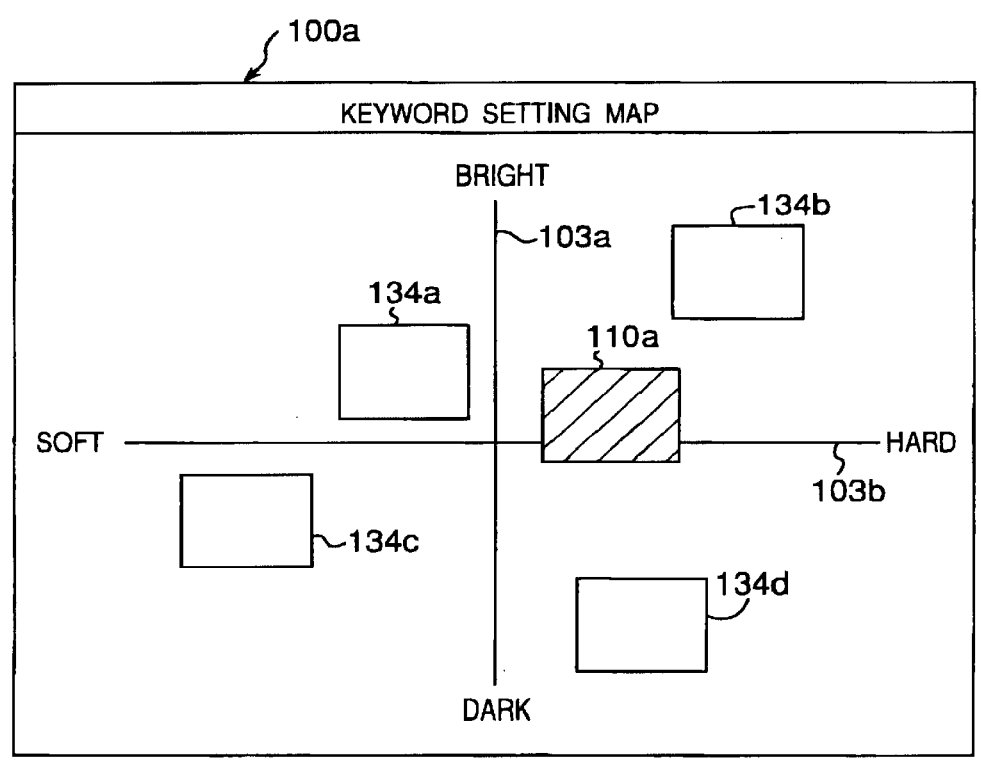
FIG. 16 is a view showing a keyword setting map having feature axes.

In this process, first, the CPU 201 displays a keyword image list 105 (S43221a). The user selects images similar to a target image 110a from the keyword image list 105, and positions the keyword images onto the keyword setting map 100a. The user positions images on the map 100a so that similar images are close to one another. In this case, it is possible that, on the map 100a, feature axes 103a, 103b showing features are placed and keyword images 134a, 134b, are positioned according to the features shown by the axes 103a, 103b as shown in FIG. 16.

Returning to FIG. 15, the CPU 201 selects images from the keyword image list 105 according to the user's operation (S43222a). The selected images are positioned onto the map 100a (S43223a). The CPU 201 iterates the keyword image selection (S43222a) and positioning (S43223a) until the user ends the selection of keyword images (S432224a).

After the completion of the positioning of keyword images, the user positions the target image 110a onto the map 100a. The CPU 201 positions the target image 110a onto the map 100a according to this user's operation (S43225a). After that, distances between the target image and the keyword images on the map 100a are calculated (S43226a), and keywords to be added to the target image 110a are selected based on the calculated distances (S43227a).

As shown above, on the map 100a, the target image is positioned after the positioning of keyword images, and keywords are selected based on the distances between those images in this embodiment. Thus, the invention can also be embodied as in the first embodiment and similar effects can be obtained.

Third Embodiment

Figure 17:
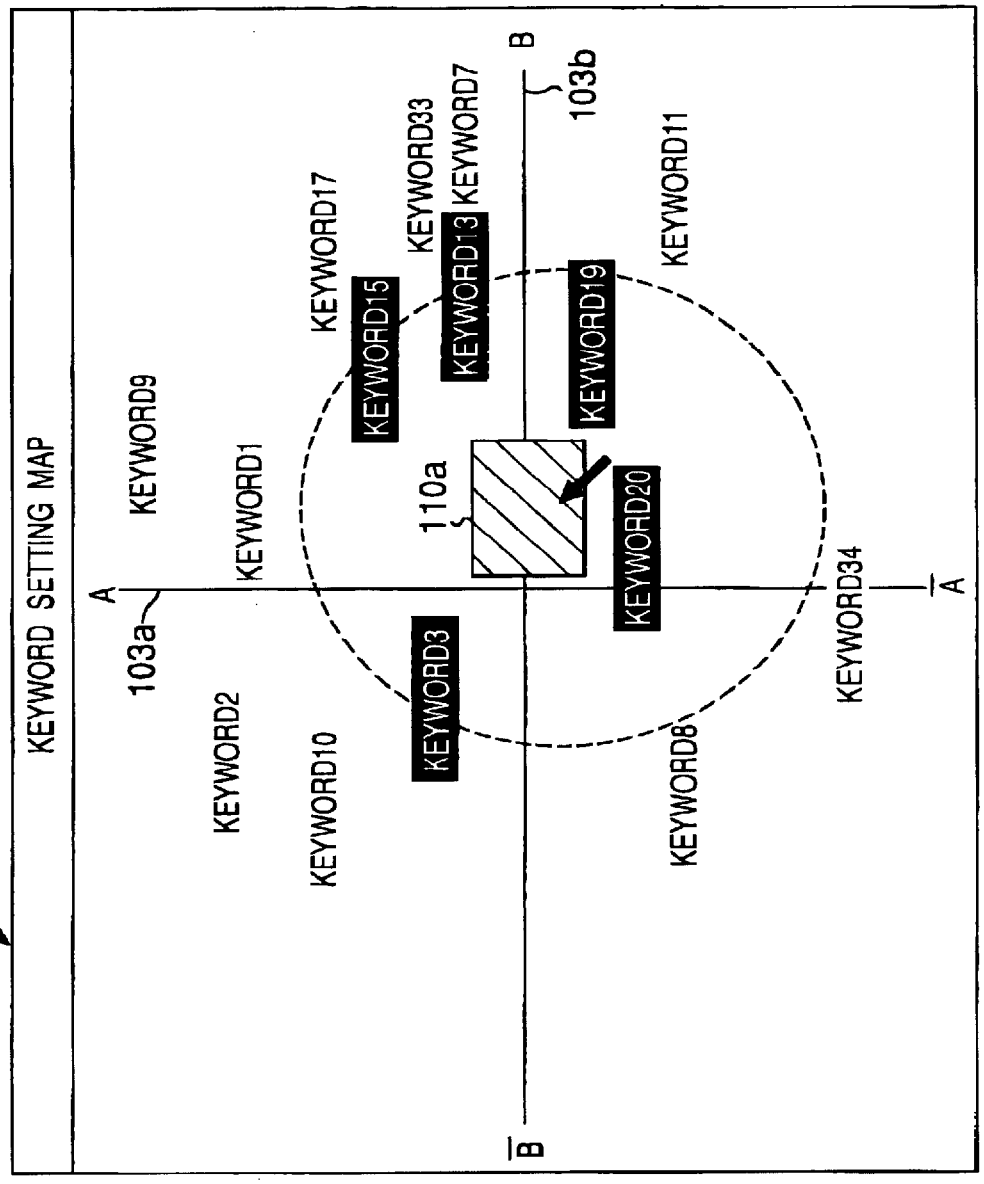
FIG. 17 is a view for explaining the concept of a keyword adding method of an information processing apparatus of third embodiment.

In an information processing apparatus of this embodiment, as shown in FIG. 17, keywords positioned within a certain distance from a target image 110a are selected as keywords for the image 110a based on distances between the image 110a and keywords that have been automatically positioned onto a keyword setting map 100b according to similarity relations among the keywords. Then the selected keywords are added to the image 110a.

Figure 15:
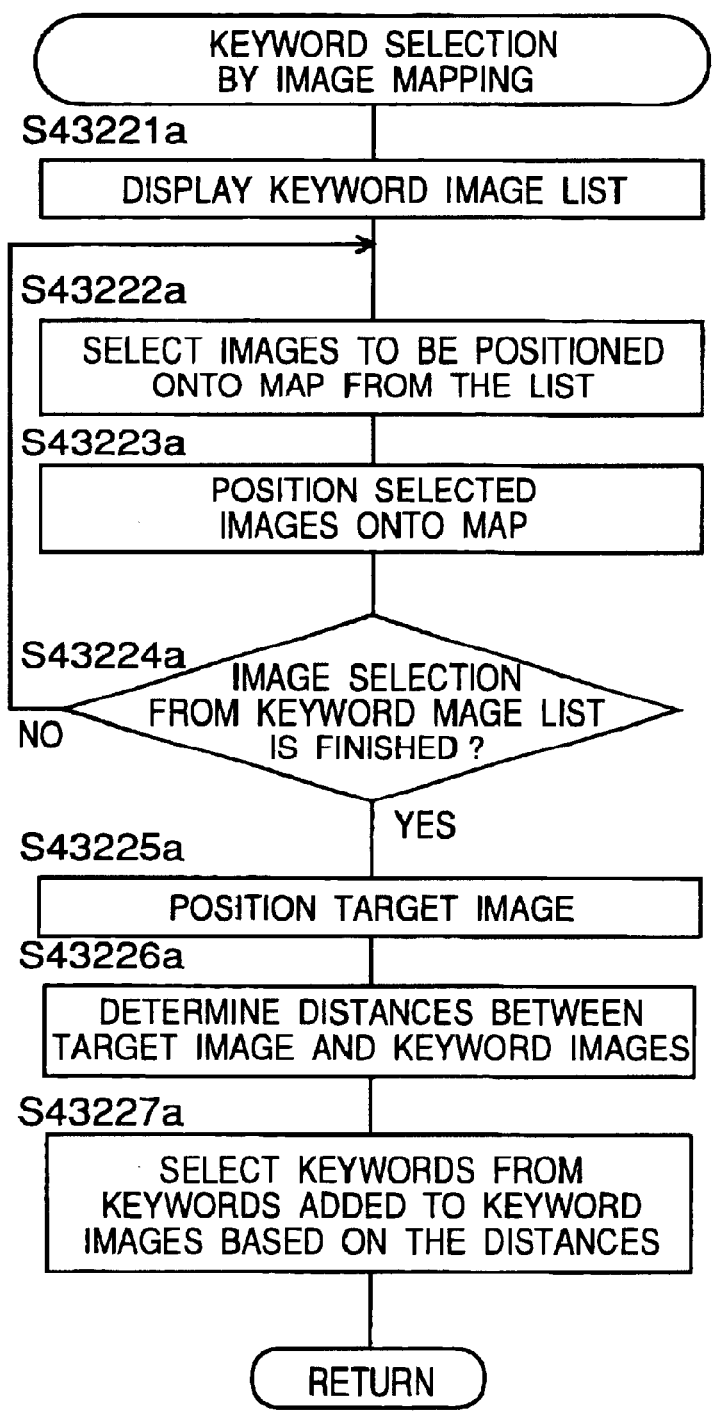
FIG. 15 is a flowchart of keyword selection process by image mapping in an information processing apparatus of second embodiment.

The configuration of this embodiment is generally similar to that of the embodiments described above, and different therefrom in the contents of the keyword selection process by image mapping shown in FIG. 11 or FIG. 15. Therefore, the following description is made only on the keyword selection process by image mapping.

Figure 18:
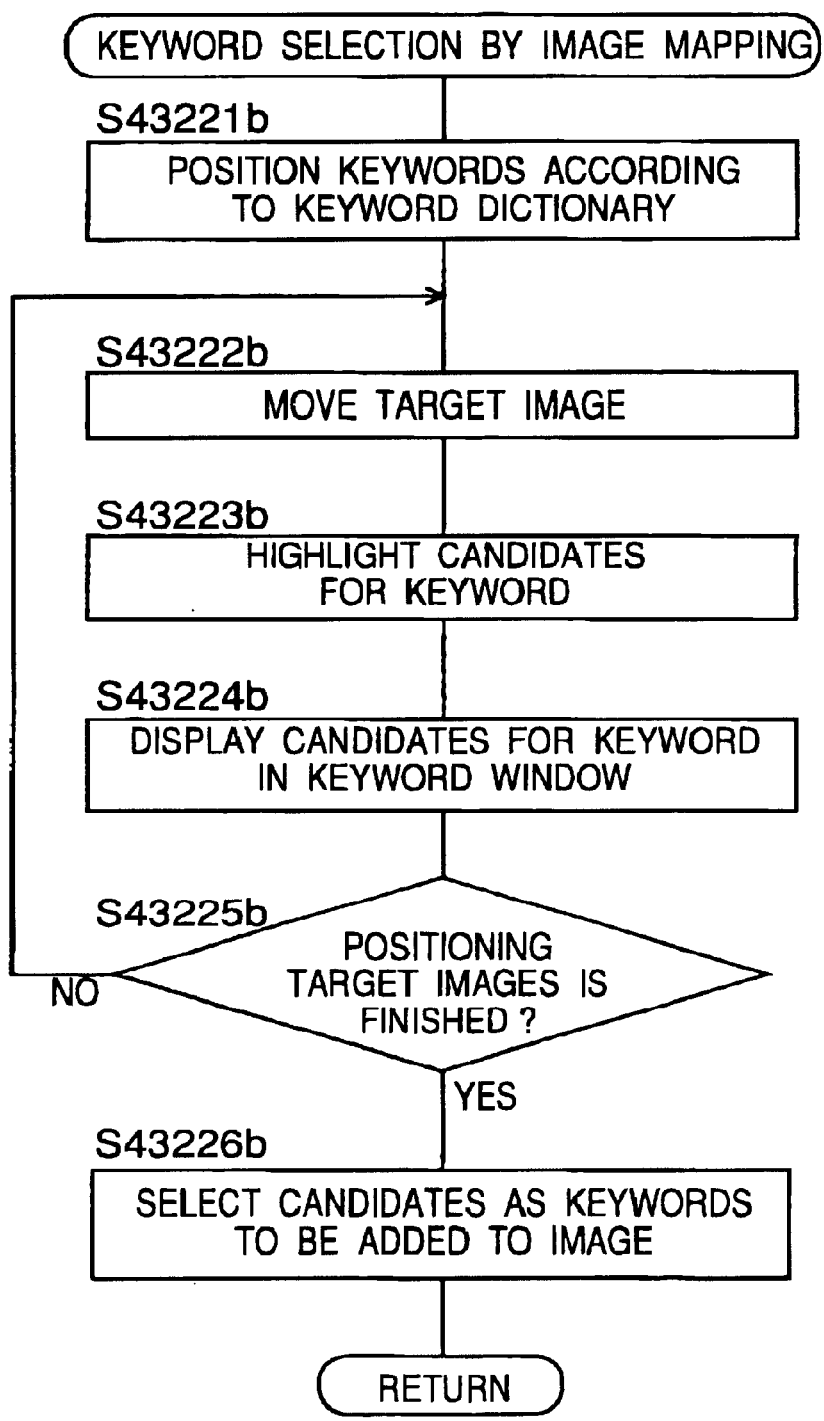
FIG. 18 is a flowchart of keyword selection process by image mapping in the information processing apparatus of third embodiment.

With reference to the flowchart of FIG. 18, the keyword selection process by image mapping in this embodiment is described.

In this process, first, keywords are positioned onto the map 100b according to the association degree for specified relation-items with reference to a keyword dictionary 52 (S43221b). In this case, feature axes 103a, 103b showing features have previously been provided on the map 100b, and the target image 110a and keywords are positioned onto the map 100b according to the features shown by these axes 103a, 103b. That is, by referring to the keyword dictionary 52, the CPU 201 reads out the association degrees of keywords to the relation-items by associating the features shown by the axes 103a, 103b with the relation-items, and positions the keywords onto the map 100b based on the association degrees.

In the example shown in FIG. 17, the two axes 103a, 103b are placed on the map 100b, and therefor keywords are positioned onto the map 100b of two dimensions based on association degrees for two relation-items. In this case, it is also possible that positioning among the keywords is performed with respect to n relation-items. That is, by setting n feature axes and by positioning keywords to the respective axes based on the association degrees, the keywords can be positioned onto a keyword setting map of n dimensions.

After the positioning keywords, the user performs an operation of moving the target image 110a to which keywords are to be added to around an appropriate keyword of which impression is regarded by the user as close to one of the target image 110a.

Along with this operation, the CPU 201 moves the image 110a as shown in FIG. 19 (S43222b), and subsequently highlights keywords positioned within a predetermined distance from the image 110a as keyword candidates (S43223b). In FIG. 19, a KEYWORD3, a KEYWORD13, a KEYWORD 15, a KEYWORD19 and a KEYWORD20 are highlighted as keyword candidates. At the same time, those keyword candidates are displayed in a keyword window 107 other than the map 100b (S43224b).

After that, from judgment of a user's operation, it is decided whether or not the positioning the image 110a has been completed, i.e., the position of the image 110a has been established (S43225b). When the position has not been established, the program returns to step S43222b. Otherwise, keyword candidates that have been selected at that time are selected as keyword (S43226b).

The keywords selected as keywords to be added to the image are then added to the image and further registered in the image database 50 together with the image in the same way as in the first embodiment.

As shown above, in the information processing apparatus of this embodiment, for the addition of keywords to an image, on a map on which keywords have been positioned, the image is positioned around keywords to be added to the image. Only doing this allows a plurality of related keywords to be simultaneously selected and added to the image, simply. Thus, the burden on the user in the keyword addition work is reduced.

The above embodiments have been described by using image data as objects and keywords as additional information. However, without being limited to this, the present invention can also be embodied by using document data, audio data or the like as objects, and information as to hue, icon or others to be added to the objects as additional information.

Although the present invention has been described in connection with specified embodiments thereof, many other modifications, corrections and applications are apparent to those skilled in the art. Therefore, the present invention is not limited by the disclosure provided herein but limited only to the scope of the appended claims.

What is claimed is:

1. An information processing apparatus for storing and managing objects together with additional information in a database, said apparatus comprising:
   a positioning unit that positions a target object and at least one of additional information objects having additional information onto an n-dimensional map;
   a distance calculating unit that calculates distances between the target object and the additional information objects on the n-dimensional map after the positioning by said positioning unit;
   a selection unit that selects additional information to be added to the target object from the additional information added to the additional information objects, based on said calculated distances; and
   a registration unit that registers the selected additional information to the database by adding said additional information to the target object.

2. The information processing apparatus according to claim 1, wherein said positioning unit first positions the target object and then positions the additional information objects around the target object.

3. The information processing apparatus according to claim 1, wherein said positioning unit first positions the additional information objects and the positions the target object.

4. The information processing apparatus according to claim 1, wherein said selection unit selects, as information to be added to the target object, additional information belonging to additional information objects, said additional information objects positioned within a predetermined distance from the target object.

5. The information processing apparatus according to claim 1, wherein said selection unit selects, as information to be added to the target object, additional information belonging to a plurality of additional information objects in common from additional information belonging to additional information objects, said additional information objects positioned within a predetermined distance from the target object.

6. The information processing apparatus according to claim 1, wherein said selection unit increases number of selecting additional information as a distance between the target object and the additional information objects becomes shorter.

7. The information processing apparatus according to claim 1, wherein said registration unit registers additional information with higher priority as a distance between the target object and the additional information objects with said additional information becomes shorter.

8. The information processing apparatus according to claim 1, wherein said object includes at least one of image data, speech data and document data.

9. The information processing apparatus according to claim 1, wherein said additional information is a keyword.

10. An information processing method for storing and managing objects together with additional information in a database, said method comprising:
    positioning a target object and at least one of additional information objects having additional information onto an n-dimensional map;
    calculating distances between the target object and the additional information objects on the n-dimensional map after the positioning;
    selecting additional information to be added to the target object from the additional information added to the additional information objects, based on said calculated distances; and
    registering the selected additional information to the database by adding said additional information to the target object.

11. A data storage medium recording a program for storing and managing objects together with additional information in a database, said program comprising the steps of:
    positioning a target object and at least one of additional information objects having additional information onto an n-dimensional map;
    calculating distances between the target object and the additional information objects on the n-dimensional map after the step of positioning;
    selecting additional information to be added to the target object from the additional information added to the additional information objects, based on said calculated distances; and
    registering the selected additional information to the database by adding said additional information to the target object.

12. An information processing apparatus for storing and managing objects together with additional information in a database, said apparatus comprising:
    a positioning unit that positions additional information and an object onto the n-dimensional map;
    a distance calculating unit that calculates a distance between the additional information and the object on the n-dimensional map after the positioning by said positioning unit;
    a selection unit that selects additional information to be added to the object from the additional information positioned on the n-dimensional map based on the calculated distance; and
    a registration unit that registers the selected additional information to the database by adding said additional information to the object.

13. The information processing apparatus according to claim 12, wherein said selection unit selects, as information to be added to the object, additional information positioned within a predetermined distance from the object on the n-dimensional map.

14. The information processing apparatus according to claim 12, further comprising a unit that highlights additional information which is selected as information to be added to the object while the object is positioned onto the n-dimensional map.

15. The information processing apparatus according to claim 12, further comprising a unit that displays additional information which is selected as information to be added to the object in a predetermined area out of the n-dimensional map while the object is positioned onto the n-dimensional map.

16. The information processing apparatus according to claim 12, wherein said object includes at least one of image data, speech data and document data.

17. The information processing apparatus according to claim 12, wherein said additional information is a keyword.

18. An information processing method for storing and managing objects together with additional information in a database, said method comprising:
    positioning additional information and an object onto the n-dimensional map;

calculating a distance between the additional information and the object on the n-dimensional map after the positioning;

selecting additional information to be added to the object from the additional information positioned on the n-dimensional map based on the calculated distance; and registering the selected additional information to the database by adding said additional information to the object.

19. A data storage medium recording a program for storing and managing objects together with additional information in a database, said program comprising the steps of:

positioning additional information and an object onto the n-dimensional map;

calculating a distance between the additional information and the object on the n-dimensional map after the step of positioning;

selecting additional information to be added to the object from the additional information positioned on the n-dimensional map based on the calculated distance; and registering the selected additional information to the database by adding said additional information to the object.

20. A computer program product comprising a computer usable medium having thereon a computer readable program for storing and managing objects together with additional information in a database, by performing the operations of:

positioning additional information and an object onto and n-dimensional map;

calculating a distance between the additional information and the object on the n-dimensional map after the operation of positioning;

selecting additional information to be added to the object from the additional information positioned on the n-dimensional map based on the calculated distance; and registering the selected additional information to the database by adding said additional information to the object.

* * * * *

UNITED STATES PATENT AND TRADEMARK OFFICE
CERTIFICATE OF CORRECTION

| | |
|---|---|
| PATENT NO. | : 6,792,417 B1 |
| DATED | : September 14, 2004 |
| INVENTOR(S) | : Takatoshi Mochizuki |

It is certified that error appears in the above-identified patent and that said Letters Patent is hereby corrected as shown below:

<u>Column 14,</u>
Line 22, please add the following claims 21, 22, 23, 24, 25, 26 and 27,
-- 21.  An information processing apparatus for storing and managing objects together with additional information, said apparatus comprising:
 a positioning unit that positions a target object and at least one of additional information objects having additional information onto an n-dimensional map;
 a distance calculating unit that calculates distances between the target object and the additional information objects on the n-dimensional map after the positioning by said positioning unit;
 a selection unit that selects additional information to be added to the target object from the additional information added to the additional information objects, based on said calculated distances; and
 a registration unit that registers the selected additional information to the database by adding said additional information to the target object.

22.   An information processing method for storing and managing objects together with additional information, said method comprising:
 positioning a target object and at least one of additonal information objects having additional information onto an n-dimensional map;
 calculating distances between the target object and the additional information objects on the n-dimensional map after the positioning;
 selecting additional information to be added to the target object from the additional information added to the additional information objects, based on said calculated distances; and
 registering the selected additonal information to the database by adding said additional information to the target object.

23.    A data storage medium recording a program for storing and managing objects together with additional information, said  program comprising the steps of:
 positioning a target object and at least one of additional information objects having additional information onto an n-dimensional map;
 calculating distances between the target object and the additional information objects on the n-dimensional map after the step of positioning;
 selecting additional information to be added to the target object from the additional information added to the additional information objects, based on said calculated distances; and
 registering the selected additional information to the database by adding said additional information to the target object.

UNITED STATES PATENT AND TRADEMARK OFFICE
CERTIFICATE OF CORRECTION

PATENT NO.    : 6,792,417 B1
DATED         : September 14, 2004
INVENTOR(S)   : Takatoshi Mochizuki It is certified that error appears in the above-identified patent and that said Letters Patent is hereby corrected as shown below:

Column 14 (cont'd),
24.    An information processing appartus for storing and managing objects together with additional information, said apparatus comprising:
   a positioning unit that positions additonal information and an object onto the n-dimensional map;
   a distance calculating unit that calculates a distance between the additional information and the object on the n-dimensional map after the positioning by said positioning unit;
   a selection unit that selects additional information to be added to the object from the additional information positioned on the n-dimensional map based on the calculated distance; and
   a registration unit that registers the selected additional information to the database by adding said additional information to the object.

25.    An information processing method for storing and managing objects together with additional information, said method comprising:
   positioning additional information and an object onto the n-dimensional map;
   calculating a distance between the additional information and the object on the n-dimensional map after the positioning;
   selecting additional information to be added to the object from the additional information positioned on the n-dimensional map based on the calculated distance; and
   registering the selected additional information to the database by adding said additional information to the object.

26.    A data storage medium recording a program for storing and managing objects together with additional information, said program comprising the steps of:
   positioning additional information and an object onto the n-dimensional map;
   calculating a distance between the additional information and the object on the n-dimensional map after the step of positioning;
   selecting additional information to be added to the object from the additional information positionaed on the n-dimensional map based on the calculated distance; and
   registering the selected additional information to the database by adding said additional information to the object.

27.    A computer program product comprising a computer usable medium having thereon a computer readable program for storing and managing objects together with additional information, by performing the operations of:
   positioning additional information and an object onto and n-dimensional map;

UNITED STATES PATENT AND TRADEMARK OFFICE
CERTIFICATE OF CORRECTION

PATENT NO. : 6,792,417 B1
DATED : September 14, 2004
INVENTOR(S) : Takatoshi Mochizuki It is certified that error appears in the above-identified patent and that said Letters Patent is hereby corrected as shown below:

Column 14 (cont'd),
 calculating a distance between the additional information and the object on the n-dimensional map after the operation of positioning;
 selecting additional information to be added to the object from the additional information positioned on the n-dimensional map based on the calculated distance; and
 registering the selected additonal information to the database by adding said additional information to the object. --

Signed and Sealed this

Fifth Day of July, 2005

JON W. DUDAS
*Director of the United States Patent and Trademark Office*